Figure 4:
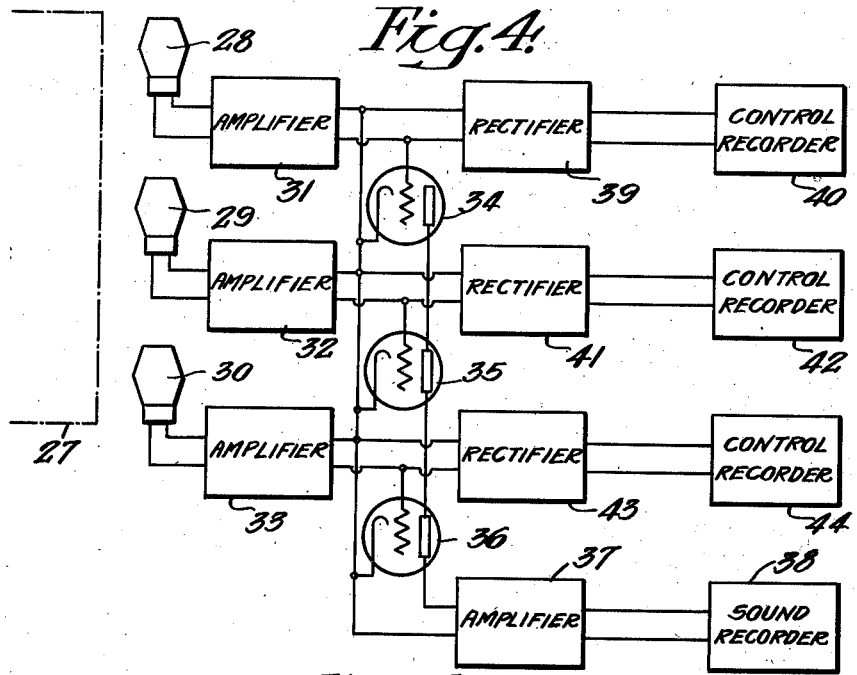

Jan. 20, 1942. C. M. BURRILL 2,270,260
PRODUCTION AND REPRODUCTION OF SOUND RECORDS
Filed Dec. 24, 1937 3 Sheets-Sheet 1
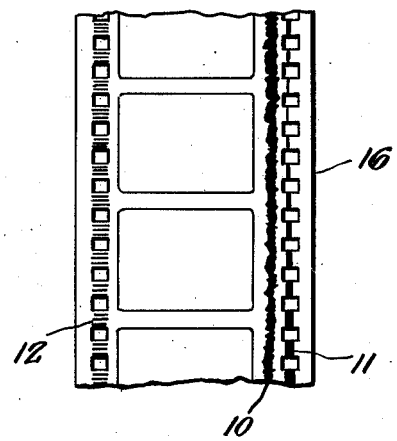
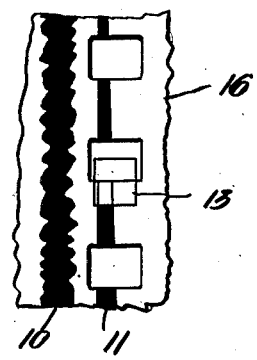
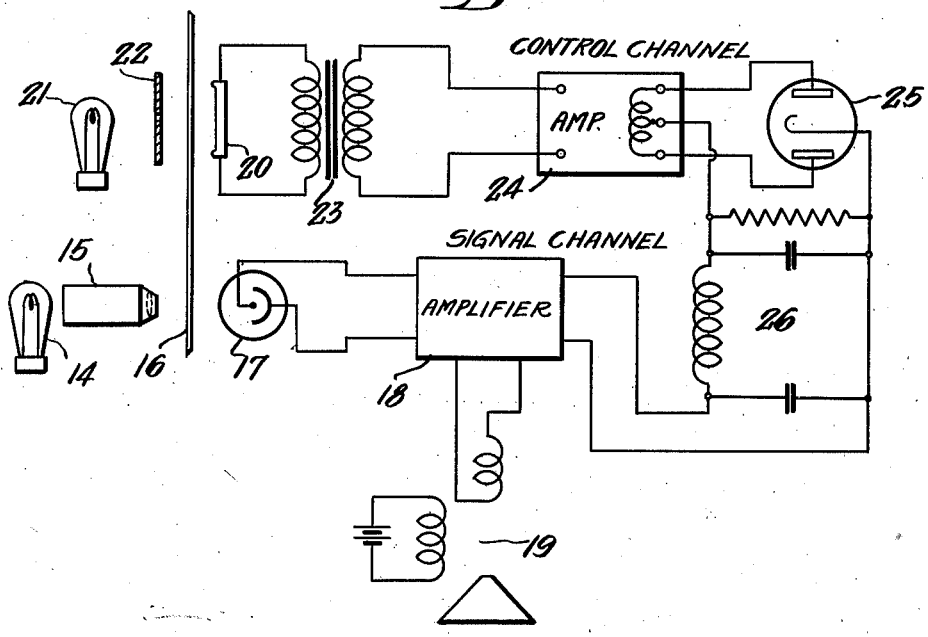
Inventor
Charles M. Burrill
By
Attorney Jan. 20, 1942. C. M. BURRILL 2,270,260
PRODUCTION AND REPRODUCTION OF SOUND RECORDS
Filed Dec. 24, 1937 3 Sheets-Sheet 2

Inventor
Charles M. Burrill
By
Attorney

Jan. 20, 1942.        C. M. BURRILL        2,270,260
PRODUCTION AND REPRODUCTION OF SOUND RECORDS
Filed Dec. 24, 1937        3 Sheets-Sheet 3
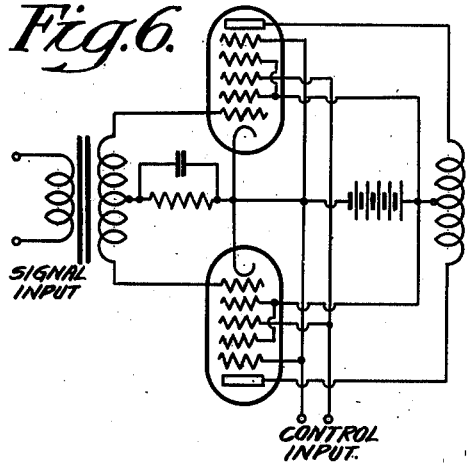
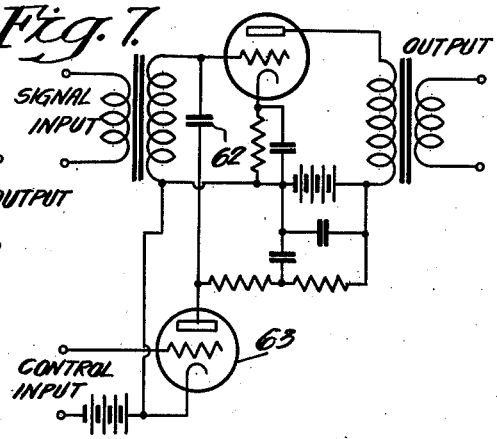
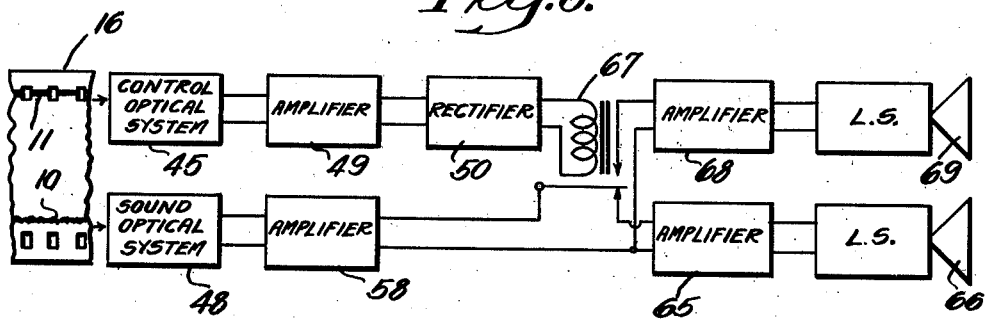
Inventor
Charles M. Burrill
By
Attorney Patented Jan. 20, 1942

2,270,260

UNITED STATES PATENT OFFICE 2,270,260

PRODUCTION AND REPRODUCTION OF SOUND RECORDS

Charles M. Burrill, Haddonfield, N. J., assignor to Radio Corporation of America, a corporation of Delaware Application December 24, 1937, Serial No. 181,634

4 Claims. (Cl. 179—100.3)

This invention relates to the production and reproduction of sound and other records such as are utilized in conjunction with motion pictures, and has for its principal object the provision of an improved apparatus and method of operation whereby the quality of the sound reproduced from such records is rendered more acceptable to the hearer.

A further object of the invention is the provision of an improved arrangement of control records which are adapted to produce a variety of results such as volume control of the reproduced sound, the production of stereophonic or sound directional effects, frequency range control of the sound reproduced at different points, the switching of the signal channel from one loud speaker to another, the switching from one motion picture projector to another, the control of theatre illumination, the production of special noise effects and the like.

An important feature of the invention is the utilization of the motion picture film sprocket holes to produce a carrier frequency signal which is modulated by one or more of the control tracks provided for producing some of the above indicated operations. To this end, one or more control tracks may be recorded along the edge of the film in alignment with the customary sprocket holes. It is also contemplated to record some of the control tracks in the space between the different or successive pictures. In the latter case, the carrier frequency of the control track is, of course, somewhat lower since the number of picture frame lines is smaller than the number of sprocket holes.

The invention is distinguished from the "control tone" method, which is well known, in the character of the control signal, which is particularly suitable for use on sound motion picture film such as is employed for theatre reproduction. Thus, the control channel consists of a track, similar to the sound track, located over the sprocket holes at one edge of the film. This location is advantageous in that this film area is not useful for any other purpose, and is about the only area available for a control channel. A feature of the invention is a method of making this area useful for control signals.

The control track over the sprocket holes may be similar to a regular sound track, except as hereafter described, and may be recorded in the same manner as the sound track, either simultaneously or at a different time, just as though the sprocket holes were not present. This can be readily accomplished by the use of a recorder of any of the well-known types. The control track may be either variable density or variable area, although the latter is preferable to eliminate differences in control due to film processing, and need not be the same type as the regular sound track. The control track is scanned by a relatively wide slit in reproduction, the width of this slit being chosen as wide as possible without appreciably decreasing the amplitude of the 96 cycle per second tone generated by the sprocket holes. The combined effect of the track proper and the sprocket holes is equivalent to a square wave of 96 cycle fundamental frequency, modulated in amplitude in accordance with the amplitude (or density) of the control track. When this is scanned by the wide aperture (slit), the higher harmonic components of the square wave are not reproduced efficiently, and as a result, the output is chiefly a modulated 96 cycle tone. Selective circuits may be used in the reproducing control amplifier to further "shape" the wave, if desired.

The width of slit required to accomplish the above is approximately half of the distance between sprocket holes. With such a scanning slit, it is apparent that there is no advantage in attempting to vary the control signal faster than corresponding to a frequency of 96 cycles, because more rapid variation would not be reproduced. This does not, however, prove a practical limitation on the usefulness of the method, for ordinarily there is no occasion for varying a volume control tone more rapidly than this. The scanning slit is preferably shorter than the transverse dimension of a sprocket hole, to prevent illumination of the longitudinal edges of the holes, which might scatter light into the regular sound track. The photo-cell output resulting from scanning the control track may be amplified by a tuned 96 cycle amplifier, if desired, then rectified, and the rectified voltage used to control the gain in the regular sound amplifier, for example by applying it to the gain control grid of a 6L7 tube, all in a well known manner.

It is possible to use the more usual very narrow scanning slit for the control track, in which case the amplifier circuits would serve to shape the output. In fact the rectifier would derive the correct D. C. potential even if the square wave were impressed on it. Although not specifically stated, it has been assumed above that the original D. C. component from the photocell is removed by the amplifier. It is very advantageous to use the wide scanning slit because the optical efficiency is roughly proportional to the slit width. With the very wide slit which may be used (.093 inch) the sensitivity is very great, and a very simple optical system may be used. Thus a barrier layer photo cell may be used in place of the more cumbersome photoelectric cell required for the sound channel. Also a specially designed exciter lamp is not required. The barrier layer cell is satisfactory in spite of its high capacitance because of the low frequency involved. Also the greater inherent sensitivity makes it unnecessary to use any lenses in the optical system, thus keeping the cost of the device low. Sufficient output is obtainable without difficulty from the photocell with a suitable transformer to permit transmitting the control signal to the amplifier located some distance away, as is usually done with the sound channel. The transformer necessary would be very simple and efficient, since it could be roughly tuned to 96 cycles.

Control tracks of the above indicated character are capable of producing a variety of desirable results not heretofore realized from the recording surface of a single motion picture film.

First, such control channels may be utilized for volume control in the manner indicated above.

Second, such control channels may be used to produce stereophonic or sound directional effects. For example, sound may be collected from a plurality of microphones distributed in space about the sound source, the outputs of these microphones being mixed and recorded on a single sound track. Control tracks may also be recorded, each one proportional to the volume from a corresponding microphone before the mixing. Then, in reproduction, these control tracks may be used to control the average volume of separate loudspeakers, all fed from the same sound track and spaced corresponding to the spacing of the recording microphones. In this way sound may be reproduced in "auditory perspective."

Third, a control track may be used to control the frequency range reproduced by a corresponding loudspeaker, when one or more loudspeakers are used. For example, one frequency range may be indicated for speech and another for music. Or one or more loudspeakers may be used for speech and others for music. Thus these speakers may be especially designed for these uses. Special noises from sources remote from the main scene could be reproduced from speakers distributed from the rear or sides of the theatre and brought into action by control tracks. Along this line many new resources for dramatic effects become possible.

Fourth, a control track may be made to generate impulses similar to those produced by dialing with an automatic telephone. Then using standard telephone methods, these impulses could be used to select and operate an almost endless number of relays as desired, in order to control almost anything, such as, dimming the house lights, special lighting effects, special sound effects or noises, switching from one projector to another, etc.

The space between picture frames may be used for control channels entirely analogously to the use of the space between sprocket holes, described above, except that in this case the variation in modulation which will be significant above the noise level produced by the picture and the clear film between will be much less because the average picture density is much greater than "that" of the sprocket hole, and the area of the picture is much greater with respect to the space between than that of the sprocket holes. However, enough "volume range" is left to give useful control, and the width of the picture should permit the use of a considerable number of control tracks side by side. Thus, using the space along both rows of sprocket holes and that between picture frames, at least eight control channels may be provided. Those using the sprocket hole spaces will be relatively fast because of the effective 96 cycle carrier frequency, while those between the pictures will be slower correspondingly because of the effective carrier of 24 cycles (frame frequency). These different control tracks may be recorded and scanned at different phases relative to each other or to the standard sound track if used, or at the same phase, as long as the same phase is used in each channel for recording and reproducing. Usually these control tracks will be scanned with the film moving continuously so there must then be a phase displacement relative to the picture, which is viewed intermittently.

However, a control channel with an effective carrier of 24 cycles (frame frequency) may be scanned at the picture gate where the film is moving intermittently, and this method has advantages where the control track is to use the space between picture frames. In this way the ground noise effect of the picture is excluded from the control channel, by illuminating the control track only when the film is stationary and the scanning aperture is over the space between pictures. Thus the average density under the aperture determines the intensity of the light which reaches the photocell continuously while the picture is illuminated (film stationary) no light being impressed or received (for control) while the film is moved. The sector wheel used to cut the light to the screen, if located before the light reaches the film, could be used, or if not, a special sector wheel could be provided. The sector wheels customarily used to "chop" the light to the screen have additional "chops" when the film is not moved, one or two per frame, to reduce picture flicker by increasing the flicker frequency to 48 or 72 cycles. If this same sector wheel is used, the control track carrier will be likewise increased, but not the speed of response. If a separate sector wheel is used, the control carrier may be any multiple of the frame frequency desired.

The invention will be better understood from the following description when considered in connection with the accompanying drawings and its scope is indicated by the appended claims.

Figure 5:
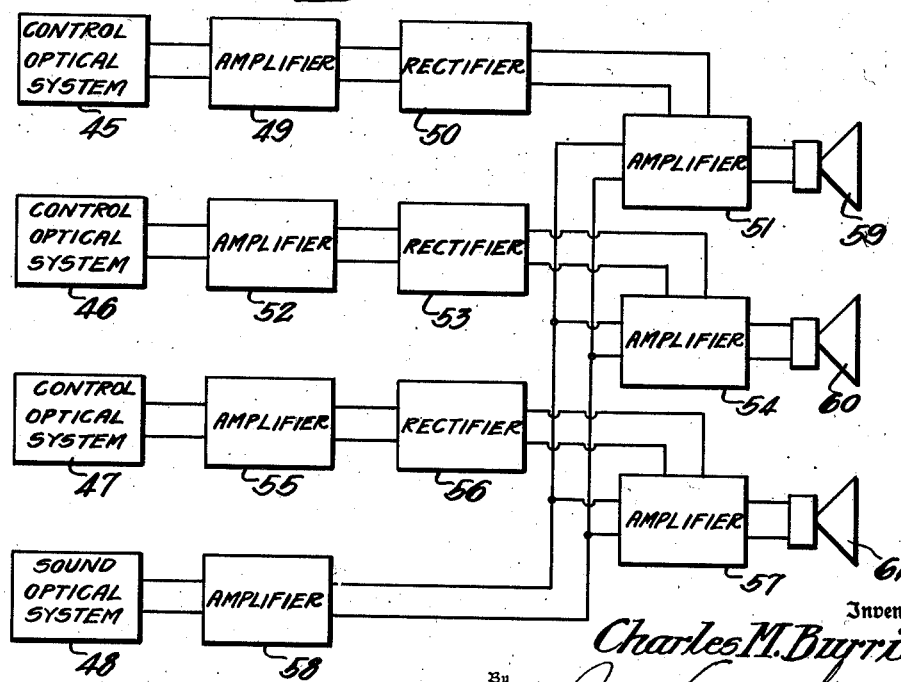

Referring to the drawings,

Figure 1 illustrates a motion picture film on which are recorded two control records each in alignment with the sprocket holes of the film, Figure 2 is a more detailed showing of the film of Fig. 1, Figure 3 is a wiring diagram of a system adapted to reproduce the sound and control records of the film of Fig. 1, Figure 4 illustrates a stereosonic type of sound recording system, Figure 5 illustrates a system adapted to reproduce the records made by the system of Fig. 4, Figure 6 is a wiring diagram of an amplifier suitable for use in the reproducing system of Fig. 5 in cases where it is desired to control selectively the volume of the sound at a plurality of loudspeakers.

Figure 7 is a wiring diagram of an amplifier suitable for use in the reproducing system of Fig. 5 in cases where it is desired to control selectively the tone quality or frequency characteristic of the sound at a plurality of loudspeakers, and Figure 8 is a block diagram illustrating the use of the improved control track for switching a signal channel from one utilization device to another.

The motion picture film of Fig. 1 is shown as provided with a sound record 10, a variable area control record 11 which is aligned with one row of sprocket holes, and a variable density control record 12 which is aligned with the other row of sprocket holes.

Fig. 2 shows in somewhat greater detail the relation of the scanning aperture 13 to the sprocket holes and the control track 11.

The reproducing system of Fig. 3 comprises a control channel and a signal channel as indicated by the legends. It will be noted that light from an exciter lamp 14 is projected through an optical system 15 and the sound track 10 of a film 16 to a photoelectric device 17 and that the audio frequency output of the device 17 is amplified by an amplifier 18 and supplied to a loudspeaker 19. The volume of the reproduced sound is controlled through the control channel which is utilized in any of the various well known ways to control the gain of the amplifier 18. The control channel itself includes a photoelectric device 20 which is preferably of the barrier layer type and to which light is projected from an exciter lamp 21 through an aperture plate 22 and one of the control records 11 or 12. The output of the photoelectric device is passed through a coupling transformer 23 to an amplifier 24. The output of this amplifier is rectified by a rectifier 25, is filtered by a network 26 and is thereafter utilized to control the gain of the amplifier 18. As explained above, a 96 cycle carrier frequency is generated by the film sprocket holes, this carrier is modulated by the control record, and the control signal is detected by the rectifier 25. If the control record is placed at the picture frames, the operation of course is similar with the exception that the carrier frequency is 24 instead of 96 cycles.

The recording system of Fig. 4 is adapted to be utilized in connection with an extended sound source indicated at 27. Sound from this source is picked up by a plurality of microphones 28, 29 and 30, and the corresponding audio frequency currents are supplied through amplifiers 31, 32 and 33 and isolating tubes 34, 35 and 36 to an amplifier 37 which controls the operation of a sound recorder 38. From these different pick-up channels, currents dependent on the volume or amplitude of the signal in each channel are supplied respectively through a rectifier 39 to a control track recorder 40, through a rectifier 41 to a control track recorder 42 and through a rectifier 43 to a control track recorder 44.

As previously indicated, the recorders 40, 42 and 44 may be provided with wide apertures and may have frequency response capabilities only up to 100 cycles or so, making possible simpler constructions and increased sensitivity. These recorders all operate on a single film to produce a sound track and three control tracks. They need not record on the film all at the same longitudinal point, provided all reproducing optical systems are correspondingly distributed longitudinally.

The reproducing system of Fig. 5 includes three control channel optical systems 45, 46 and 47 and one signal channel optical system 48. The optical system 48 may be of any suitable type, many such types being well known to those skilled in the art. The optical systems 45, 46 and 47 may be provided with wide apertures and have a frequency response restricted to below 100 cycles thus permitting simplification and greater sensitivity.

Currents modulated by the different control tracks are supplied through an amplifier 49 and a rectifier 50 to the gain control circuit of an output amplifier 51, through an amplifier 52 and a rectifier 53 to the gain control circuit of an output amplifier 54 and through an amplifier 55 and a rectifier 56 to the gain control circuit of an output amplifier 57. Current modulated by the sound track is supplied through an amplifier 58 to the output amplifiers 51, 54 and 57, the signal level at the output of each of these output amplifiers being regulated by the corresponding control track of the film. It will of course be understood that it is desirable for the loudspeakers 59, 60 and 61 to have a space distribution corresponding to that of the microphones 28, 29 and 30 and that the amplifiers 49, 52 and 55 may be broadly tuned to the control carrier, i. e., to the sprocket hole or frame frequency depending on whether the control track is located between the sprocket holes or the picture frames.

The operation of this stereosonic system is that when, for example, the sound to be reproduced comes predominantly from in front of microphone 28, the corresponding control track carries the greatest control modulation, and in reproduction the greatest control voltage output is obtained from the corresponding rectifier 50. This output is impressed on amplifier 51 so poled as to make its gain the greatest, and so the major part of the reproduced sound will come from loudspeaker 59. Similarly the sound will come mostly from loudspeaker 60 when the source is loudest near microphone 29. This makes the sound reproduction more realistic and gives directional character to it. The method is not limited to three microphones or loudspeakers,—two or more may be used. The amplifiers shown may all be assumed to have appropriate gain controls if necessary, to adjust the balance and overall operation.

Amplifiers 51, 54 and 57 may be of any type suitable for sound reproduction except that the rectified outputs of the control channels may automatically control the gains. A circuit diagram of such an amplifier is shown in Fig. 6. This circuit is shown as including a pair of multigrid tubes connected in push-pull the signal being applied to the inner control grid and the gain control potential being applied to the outer control grid.

By the provision of suitable circuits, the frequency range of the sound of the loudspeakers 59, 60 and 61 (Fig. 5) may be selectively controlled. Fig. 7 illustrates a circuit suitable for this purpose. The various terminals of this circuit are designated by self-explanatory legends. In the operation of this circuit, a capacitor 62 and the plate impedance of a control tube 63 form a tone control circuit of a well known type for reducing high frequency components of the signal. The plate impedance of tube 63 and correspondingly the frequency response, are varied by the control voltage impressed on the grid of tube 63.

In recording a film having control tracks for frequency range control, instead of microphones, amplifiers and rectifiers connected to the control tone recorders, as in Fig. 4, suitably varied D. C., depending on the frequency ranges desired and the control characteristics of the reproducing amplifiers, as in Fig. 7, is impressed directly on the control track recorders. Batteries and voltage dividers are suitable for providing required D. C.

This method is not limited to the use of three control tracks and three loudspeakers,—one or more of each might be used. One application to a simple system with a single control track and a single loudspeaker, is to use a two position control, with two corresponding frequency ranges, one for speech and one for music. In this case the control track output may be used to operate a relay to switch the amplifier from one fidelity condition to another. The method is not limited to control of high frequency response. By substituting an inductance for condencer 62 in Fig. 7 (and providing a suitable blocking condenser to prevent short circuiting the B supply) control of the low frequency response may be obtained. Combinations of high frequency and low frequency control may also be used.

A single control track of an off-on type may be used to actuate a relay to effect a switching operation, for example to switch the reproduction from one loudspeaker or group of loudspeakers to another speaker or group of speakers. A suitable arrangement for this purpose is illustrated by Fig. 8. Here the parts with corresponding numbers are the same as those in the previous figures. 11 is the control track, so recorded that no modulation corresponds to reproduction as shown from amplifier 65 and loudspeaker 66, whereas full modulation, through the relay 67, switches to reproduction from amplifier 68 and loudspeaker 69. The sound track 10 is reproduced by the standard optical system 48 and amplifier 58. One application of this method would be to use the channel comprising 68 and 69, for example, for speech, and the other channel comprising 65 and 66 for music. These parts may be specially designed to give the best performance for the type of sound for which they are used. More than one control track may be used with more than one relay, to effect similar but more complicated switchings. Also several relays with properly graded sensitivity may be used with a single control track, operated by corresponding degrees of modulation of the control track. The loudspeakers 66 and 69, instead of being of different design suitable for different types of sound, may be of the same design, but located at different places in the auditorium. For example, one may be on the stage and one at the rear of the audience. In this way antiphonal effects may be obtained. Another application is to use the control track operated relays to turn on or actuate various appropriate noise effects machines, such as those ordinarily used in broadcasting to simulate rain, thunder, horses' hoofs, etc.

When motion picture features more than one reel in length are reproduced, it is customary to use two projectors, alternating them for alternate reels to prevent having any disturbing break between reels. At present, at the appropriate time the operator switches over to the incoming projector already threaded and up to speed. He determines the correct time for this manual operation by observing a fleeting signal appearing in the projected picture for just a few frames. This signal placed in a predetermined position, is so chosen that the projectionist can observe it, but so that it will be inconspicuous or unnoticed by the theatre patron. Usually a similar signal is also given to time the starting of the second projector. This method is not very satisfactory because it is hard to give the projectionist an unmistakable signal without annoying those viewing the picture.

A better method would be to give those signals by means of a control track such as I have described. For example, with such a track normally unmodulated, 50% modulation may be applied at the time the second projector should be started, and this increased to 100% when the actual changeover should be made. These operations could then be effected by means of two relays, adjusted in sensitivity so that the first responds to 50% modulation, and the second to 100% modulation but not to 50%.

The ordinary dial telephone effects complicated switching at the central exchange, by means of signals provided by the dial sender. These consist of various sequences of pulses suitably timed, at the basic rate of about 7 per second. Such impulses may also be generated by a control track such as I have described, on a motion picture film. If desired, a telephone dial could be used to record such a control track. Then different "telephone numbers" could be assigned to a variety of operations which might be desired, such as 100 Dim house lights
101 Brighten house lights
102 Switch frequency response for speech
103 Switch frequency response for music
104 Switch to loudspeaker at back of auditorium
105 Switch to speaker on stage
106 Start incoming projector
107 Switch over to incoming projector
108 Insert red filter before projector for fire scene
109 Insert blue filter before projector for moonlight scene
110 Switch on special lighting display
111 Switch off same
112 Start special noise effect machine
113 Switch off same, etc.

In this way, using standard automatic telephone methods which are well known, a single control track may be used to actuate almost any desired switching sequence.

Where the modulation of the control record is dependent on the discontinuities resulting from the sprocket holes or the interframe spaces of the motion picture film, close registry of the sprocket holes of the negative and print is desirable. For this reason it is preferable that the printer utilized be of the sprocket rather than the friction drive type.

I claim as my invention:

1. The method which includes recording a sound record on a motion picture film having periodic perforations in its base, recording a control record in alignment with said perforations, utilizing said perforations to produce a carrier current, modulating said current by said control record, detecting said modulation, reproducing said sound record and utilizing said detected modulation to control a characteristic of said reproduced sound.

2. The combination of a plurality of signal pick-up devices, means for recording on one record area the signals picked up by said devices, means for recording on different record areas the amplitudes of the signals picked up by said devices, and electronic means for preventing interaction between the operation of all said recording means.

3. The combination of a plurality of signal pick-up devices, means for recording on one record area the signals picked up by said devices, means for recording on different record areas the amplitudes of the signals picked up by said devices, and isolation tubes interposed between said recording means for preventing interaction between said recording means.

4. The method which includes placing a photographic sound record on a transparent film having periodic perforations therethrough, placing a control record on said film in alignment with said perforations, utilizing said perforations to produce a carrier current, modulating said current by said control record, detecting said modulation, reproducing said sound record and utilizing said detected modulation to control a characteristic of said reproduced sound.

CHARLES M. BURRILL.